(12) United States Patent
Egami

(10) Patent No.: US 6,920,385 B2
(45) Date of Patent: Jul. 19, 2005

(54) ACCELERATOR PEDAL DEVICE

(75) Inventor: Masahiro Egami, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/462,736

(22) Filed: Jun. 17, 2003

(65) Prior Publication Data
US 2003/0236608 A1 Dec. 25, 2003

(30) Foreign Application Priority Data
Jun. 20, 2002 (JP) ...................... 2002-180005

(51) Int. Cl.[7] .............................................. B60K 26/02
(52) U.S. Cl. .......................................... 701/70; 701/96
(58) Field of Search .............................. 701/70, 93, 96, 701/301; 340/904; 342/70; 74/513

(56) References Cited

U.S. PATENT DOCUMENTS

| | | | | |
|---|---|---|---|---|
| 4,628,317 A | * | 12/1986 | Nishikawa et al. | 340/903 |
| 5,215,057 A | * | 6/1993 | Sato et al. | 123/400 |
| 5,485,892 A | * | 1/1996 | Fujita | 180/167 |
| 6,070,490 A | * | 6/2000 | Aschoff et al. | 74/513 |
| 6,542,793 B2 | * | 4/2003 | Kojima et al. | 701/1 |
| 2003/0060936 A1 | * | 3/2003 | Yamamura et al. | 701/1 |
| 2003/0190996 A1 | * | 10/2003 | Yone | 477/120 |

FOREIGN PATENT DOCUMENTS

| | | |
|---|---|---|
| DE | 195 06 629 A1 | 8/1996 |
| DE | 198 20 929 A1 | 11/1997 |
| DE | 199 16 434 A1 | 10/2000 |

(Continued)

OTHER PUBLICATIONS

Copending patent application entitled "Accelerator Pedal Device", Masahiro Egami, filed Jun. 17, 2003, our reference No. 61355–039, U.S. Appl. No. 10/462,805.

Copending patent application entitled "Driving Assist System for Vehicle", Nobuyuki Kuge et al., filed Jun. 17, 2003, our reference No. 61355–041, U.S. Appl. No. 10/462,733.

Copending patent application entitled "Driving Assist System for Vehicle", Masahiro Egami, filed Jun. 17, 2003, our reference No. 61355–042, U.S. Appl. No. 10/462,749.

*Primary Examiner*—Michael J. Zanelli
(74) *Attorney, Agent, or Firm*—McDermott Will & Emery LLP

(57) ABSTRACT

An accelerator pedal device includes: an accelerator pedal; a reaction force application device that applies a reaction force to the accelerator pedal; and a selection device that selects a characteristic between a first characteristic according to a running situation of a subject vehicle and a second characteristic specified regardless of the running situation of the subject vehicle. The first characteristic and the second characteristic each is a characteristic indicating a relationship between an amount of stepping upon of the accelerator pedal and the reaction force to be applied. The reaction force application device applies the reaction force to the accelerator pedal based upon the characteristic selected by the selection device.

13 Claims, 12 Drawing Sheets

FOREIGN PATENT DOCUMENTS

| | | |
|---|---|---|
| JP | 56-108953 U | 8/1981 |
| JP | 57-033048 | 2/1982 |
| JP | 57-167845 | 10/1982 |
| JP | 62-51035 U | 3/1987 |
| JP | 63-258225 | 10/1988 |
| JP | 02-291099 | 11/1990 |
| JP | 03-217627 | 9/1991 |
| JP | 5-231194 | 9/1993 |
| JP | 05-345536 | 12/1993 |
| JP | H 7-4211 U | 1/1995 |
| JP | 08-017000 | 1/1996 |
| JP | 08-166448 | 6/1996 |
| JP | 08-26310 | 10/1996 |
| JP | 09-254677 | 9/1997 |
| JP | 10-166889 | 6/1998 |
| JP | 10-166890 | 6/1998 |
| JP | 10-318009 | 12/1998 |
| JP | 10-338110 | 12/1998 |
| JP | 11-78595 | 3/1999 |
| JP | 2000-054860 | 2/2000 |
| JP | 2000-158970 | 6/2000 |
| JP | 2000-296724 | 10/2000 |
| JP | 2001-048034 | 2/2001 |
| JP | 2001-171497 | 6/2001 |
| JP | 2003-25870 * | 1/2003 |
| WO | WO 03/039899 A2 | 5/2003 |

\* cited by examiner

SECTION b-b

REACTION CONTROL NOT BEING PERFORMED

REACTION CONTROL BEING PERFORMED

ACCELERATOR PEDAL DEVICE

BACKGROUND OF THE INVENTION

1. Field of the Invention

The present invention relates to an accelerator pedal device which applies reaction force to an accelerator pedal.

2. Description of the Related Art

In the prior art, return force was applied by a torsion spring to an accelerator pedal, and a hysteresis effect was generated when the accelerator pedal was stepped upon and released, so that, as a result, a desired pedal actuation characteristic was obtained.

On the other hand, in Japanese Laid-Open Patent Publication No. H11-78595, there is disclosed a reaction force application device, so constituted that a reaction force which corresponds to the vehicle running environment such as distance between vehicles and the radius of curvature of a curved road and the like is applied to the accelerator pedal via a motor, so as to perform setting of the vehicle speed as appropriate to the vehicle operational environment.

SUMMARY OF THE INVENTION

However, with the above described per se known reaction force application device, it is only possible to generate a reaction force which corresponds to the vehicle running environment, and it has not been possible positively to generate hysteresis separately therefrom.

An accelerator pedal device according to the present invention comprises: an accelerator pedal; a reaction force application device that applies a reaction force to the accelerator pedal; and a selection device that selects a characteristic between a first characteristic according to a running situation of a subject vehicle and a second characteristic specified regardless of the running situation of the subject vehicle. The first characteristic and the second characteristic each is a characteristic indicating a relationship between an amount of stepping upon of the accelerator pedal and the reaction force to be applied. The reaction force application device applies the reaction force to the accelerator pedal based upon the characteristic selected by the selection device.

DESCRIPTION OF THE PREFERRED EMBODIMENT

In the following, the preferred embodiment of the accelerator pedal device according to the present invention will be explained with reference to FIGS. 1 through 13.

Figure 1:
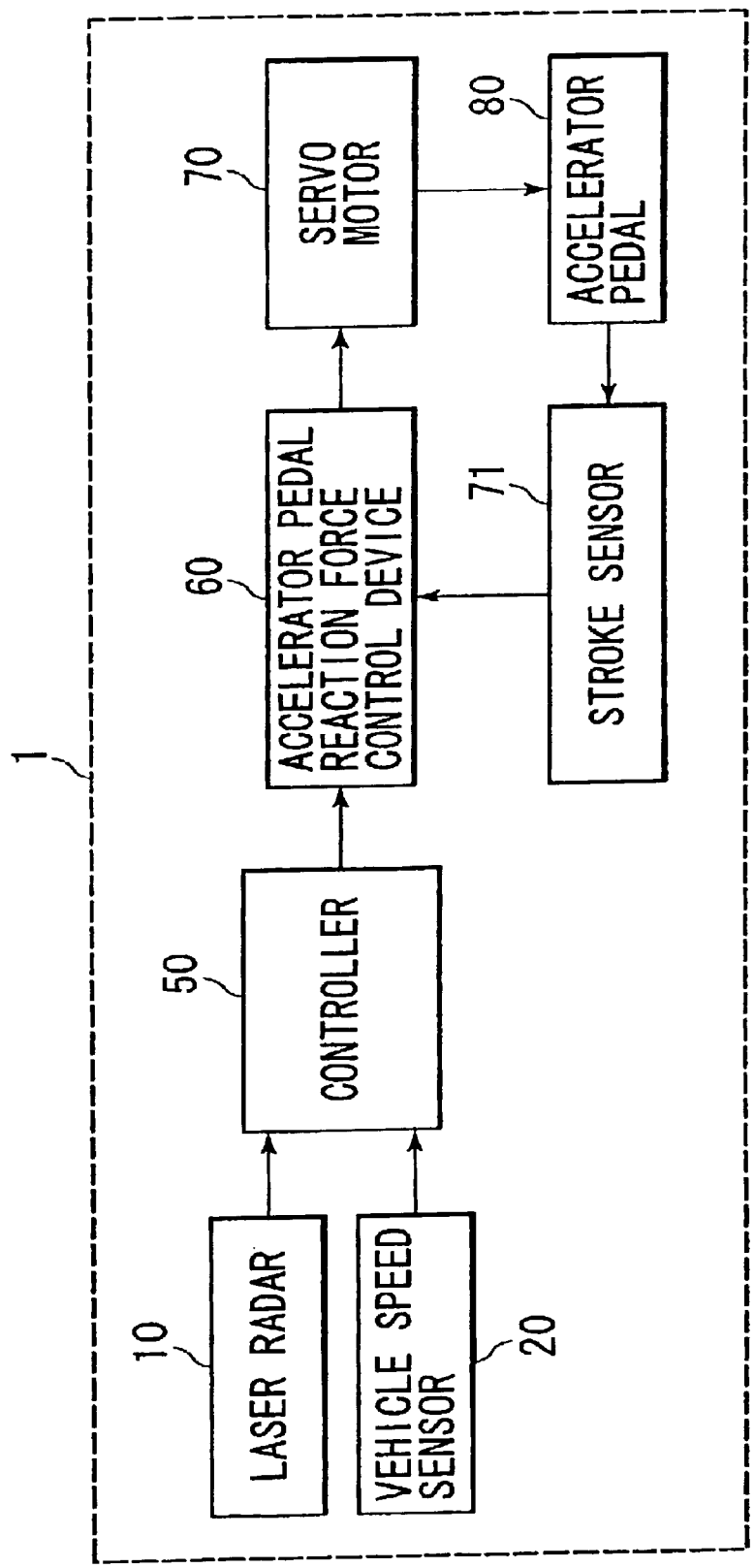
FIG. 1 is a system block diagram of a reaction force control device which comprises an accelerator pedal device according to the preferred embodiment of the present invention.
Figure 2:
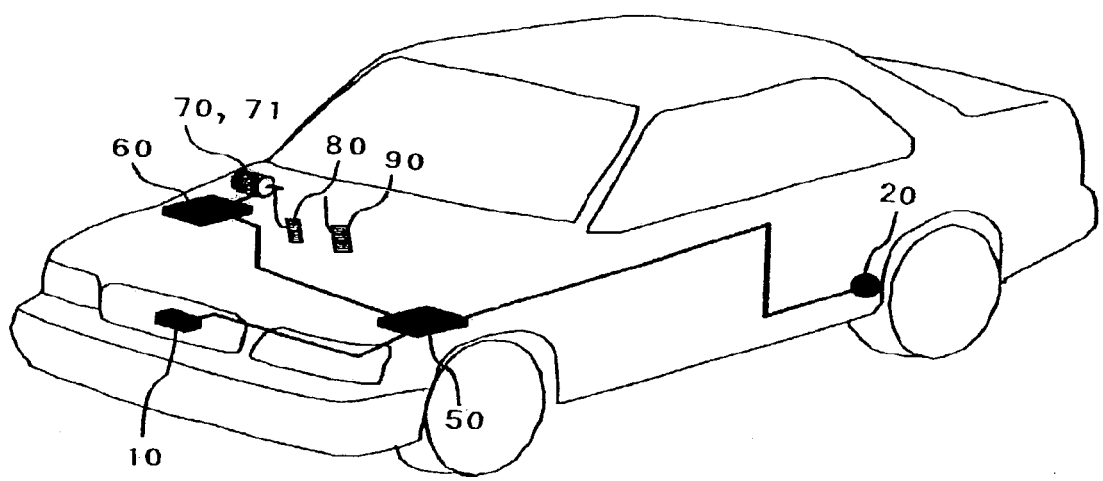
FIG. 2 is a structural view of a vehicle which is equipped with the reaction force control device of FIG. 1.

FIG. 1 is a system block diagram of a reaction force control device 1 which comprises an accelerator pedal device according to the preferred embodiment of the present invention, while FIG. 2 is a structural view of a vehicle which is equipped with this reaction force control device 1.

First, the structure of the reaction force control device 1 will be explained. A laser radar 10 is fixed to a grille portion or to a bumper portion or the like at the front of the vehicle, and emits and scans pulses of infrared light in the horizontal direction. Each of a plurality of reflective objects in front of the vehicle (normally the rear end of another vehicle in front) reflects back the infrared rays in these infrared light pulses, and the laser radar 10 measures these reflected waves and detects the distance to the vehicle in front (the distance between vehicles) and its relative speed based upon the arrival time of the reflected waves. The distance between vehicles and the relative speed which are thus detected are outputted from the laser radar 10 to a controller 50. The region in front of the vehicle which is scanned by the laser radar 10 is the region about ±6° on either side of the longitudinal line of the vehicle, and any object which is present in front of the vehicle in this region is detected in this manner. And a vehicle speed sensor 20 detects the running speed of the subject vehicle from the rotational speed of a wheel thereof or the like, and outputs this running speed to the controller 50. The subject vehicle means a vehicle to be controlled with the reaction force control.

The controller 50 calculates the degree of proximity to the vehicle in front which is running in front of the subject vehicle from the speed of the subject vehicle which are inputted from the vehicle speed sensor 20 and the distance between vehicles and the relative speed which are inputted from the laser radar 10, and estimates the current running situation of the subject vehicle. This running situation includes the state of the subject vehicle itself and the environmental state surrounding the subject vehicle. Furthermore it estimates how this running situation will change in the future, and outputs a reaction force command value to an accelerator pedal reaction force control device 60.

The accelerator pedal reaction force control device 60 controls the torque which is generated by a servo motor 70 which controls the accelerator pedal reaction force, according to the amount of actuation of the accelerator pedal 80 which is detected by a stroke sensor 71. According to the command value of the accelerator pedal reaction force control device 60, the torque which is generated by the servo motor 70 can be controlled, so that the reaction force which is generated when the driver actuates the accelerator pedal 80 can be controlled as desired.

Figures 3A, 3B:
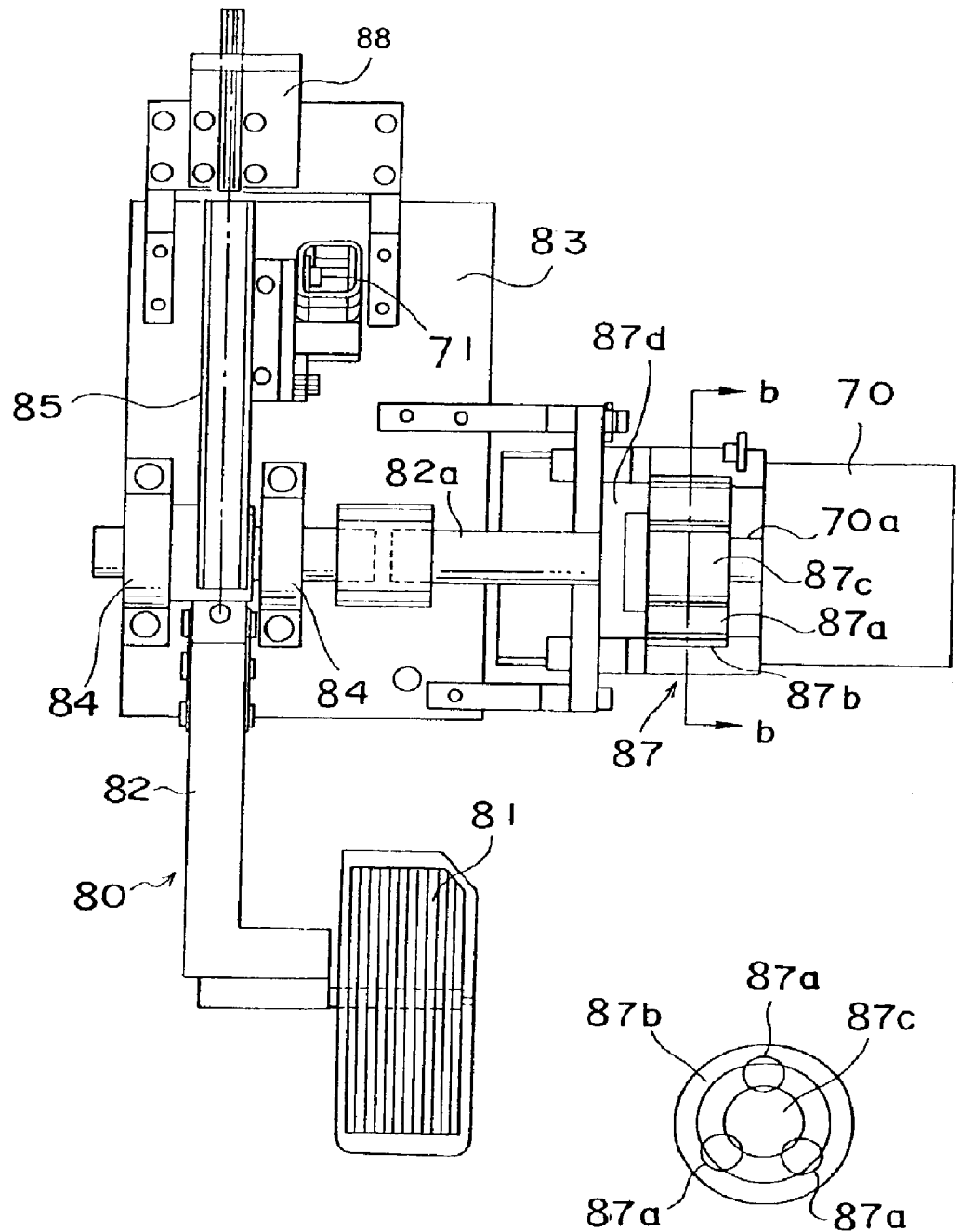
FIG. 3A is a front elevation view showing the structure of this accelerator pedal device according to the preferred embodiment of the present invention.
FIG. 3B is a sectional view of a planetary speed reduction mechanism.
Figure 4:
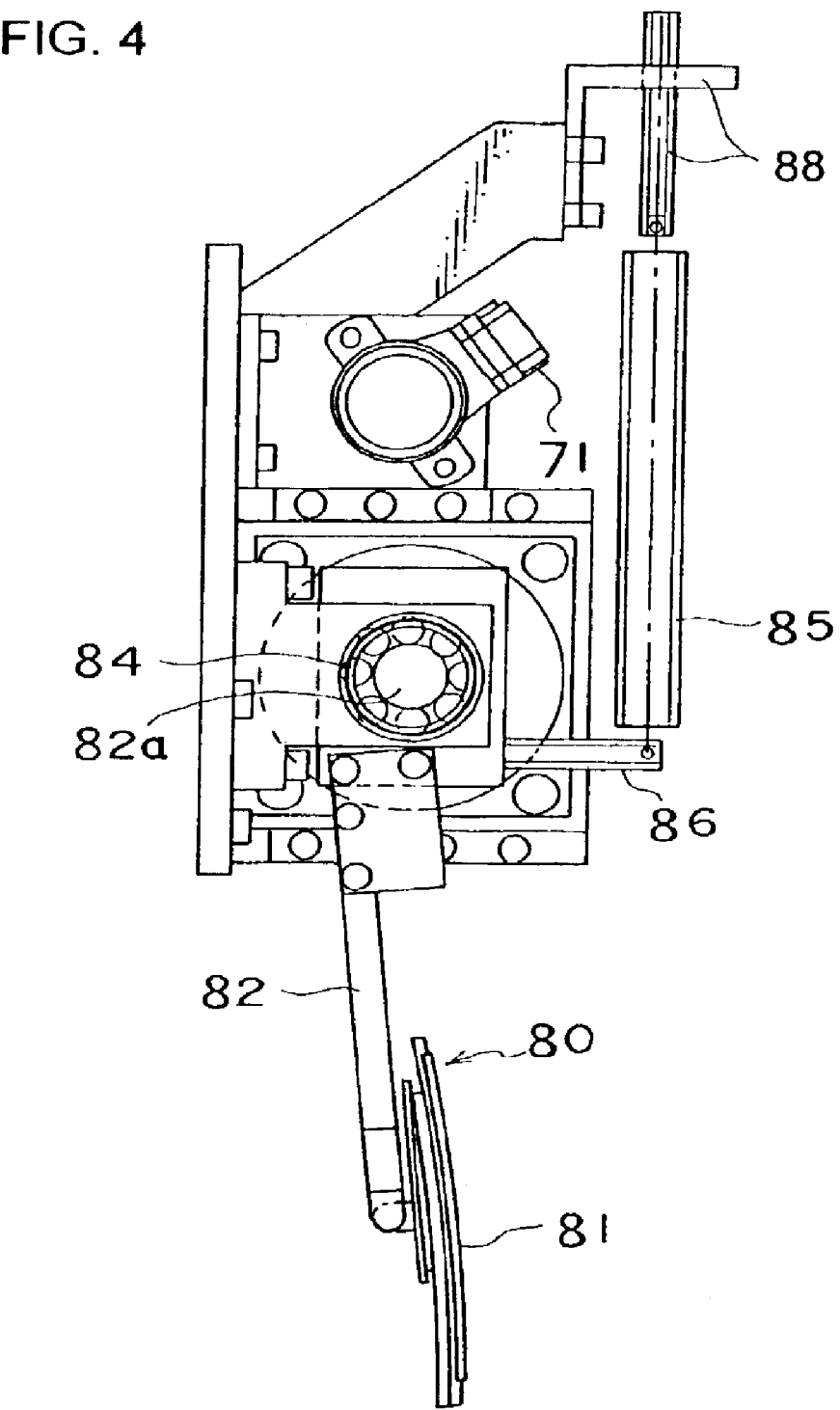
FIG. 4 is a side view showing the structure of this accelerator pedal device according to the preferred embodiment of the present invention.

FIGS. 3A and 4 are respectively an elevation view and a side view showing the structure of the accelerator pedal device according to this preferred embodiment of the present invention. The accelerator pedal 80 comprises a pedal 80 to which the driver applies foot pressure, and a lever 82 which supports this pedal 81. The lever 82 is rotatably supported via a bearing 84 upon a base plate 83 which is fixed to the vehicle body. The one end of a tension spring 85 is linked to the lever 82 via a bracket 86, and the other end of this tension spring 85 is linked to the vehicle body via a bracket 88. The spring force of this tension spring 85, which corresponds to the amount of actuation of the accelerator pedal 80, acts upon the accelerator pedal 80 as a reaction force. The stroke sensor 71 is, for example, an angular sensor which detects the amount of rotation of a rotational shaft 82*a*, and which detects the stroke S of the accelerator pedal 80 based upon this detected value. The stroke S of the accelerator pedal 80 corresponds to the amount of actuation of the accelerator pedal 80.

The rotational shaft 82*a* of the lever 82 is linked to the output shaft 70*a* of the servo motor 70 via a planetary speed reduction mechanism 87. In other words, a carrier 87*d* is integrally provided upon the tip of the rotational shaft 82*a*, and three planetary gears 87*a* are supported upon this carrier 87*d* so as to be rotatable. Along with a ring gear 87*b* which is provided so as not to be rotatable being meshed with these planetary gears 87*a*, they are also meshed with a sun gear 87*c* which is integrally formed upon the output shaft 70 of the motor 70 (refer to the cross sectional view b—b of FIG. 3B). Accordingly, it is also possible for the torque of the servo motor 70 to act upon the accelerator pedal 80 as a reaction force, in addition to the spring reaction force due to the tension spring 85. Here, the tension spring 85 and the servo motor 70 constitute a reaction force application means.

Figure 5:
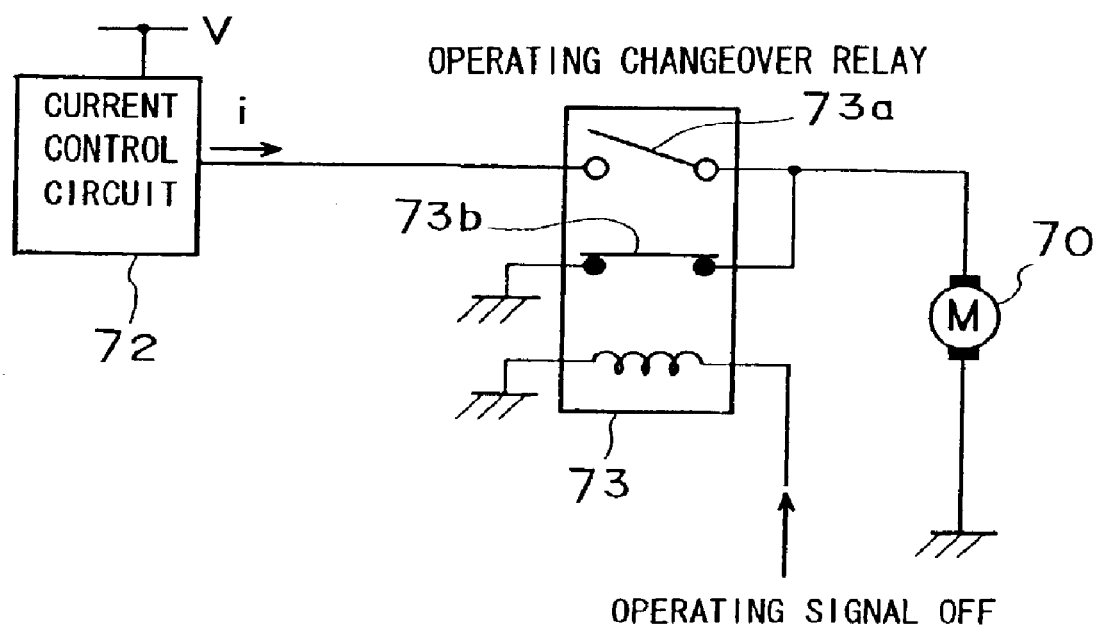
FIG. 5 is a figure showing a drive electrical circuit of a servo motor which is included in this accelerator pedal device according to the preferred embodiment of the present invention when the system is not operating.
Figure 6:
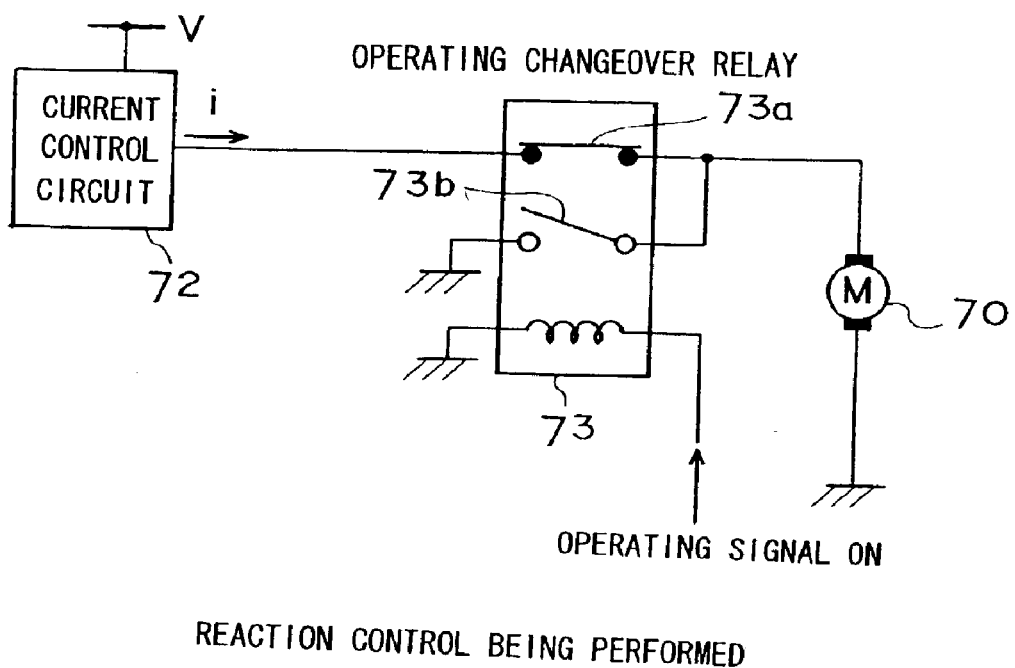
FIG. 6 is a figure showing this drive electrical circuit of the servo motor included in the accelerator pedal device according to the preferred embodiment of the present invention when the system is operating.

A drive circuit for the servo motor 70 is shown in FIGS. 5 and 6. An electric current control circuit 72 is connected to the servo motor 70 via an operation changeover relay 73. This current control circuit 72 outputs an electrical current i according to the command value of the accelerator pedal reaction force control device 60. An ON signal is outputted from the accelerator pedal reaction force control device 60 to the coil of the operation changeover relay 73 when the system is operating, while an OFF signal is outputted thereto when the system is not operating. The relay contact points 73*a* and 73*b* are opened and closed by this ON/OFF signal, so that the characteristic of the reaction force F with respect to the stroke S of the accelerator pedal 80 is changed over between a first characteristic and a second characteristic which will be explained hereinafter. It should be understood that this operation changeover relay 73 constitutes a selection means.

Next, the operation of this reaction force control device 1 according to the preferred embodiment of the present invention will be explained. The summary of this operation is as follows.

The controller 50 recognizes the running situation or state such as the distance between vehicles (the distance to the vehicle in front of the subject vehicle), their relative speed, and the running vehicle speed of the subject vehicle, and, based upon this running situation, calculates the present degree of proximity to the vehicle in front (a first risk level), and the degree of influence upon the subject vehicle due to the trend of the future movement of the vehicle in front as predicted from the present (a second risk level). Furthermore, the controller 50 predicts the future running situation or state (a risk potential RP) from the degree of proximity and the predicted degree of influence which have thus been calculated, calculates an accelerator pedal. reaction force command value $\Delta F$ based upon this risk potential RP, and outputs this command value $\Delta F$ to the accelerator pedal reaction force control device 60. The accelerator pedal reaction force control device 60 controls the servo motor 70 according to this command value $\Delta F$, and thereby the stroke reaction force characteristic of the accelerator pedal 80 is changed.

Figure 11:
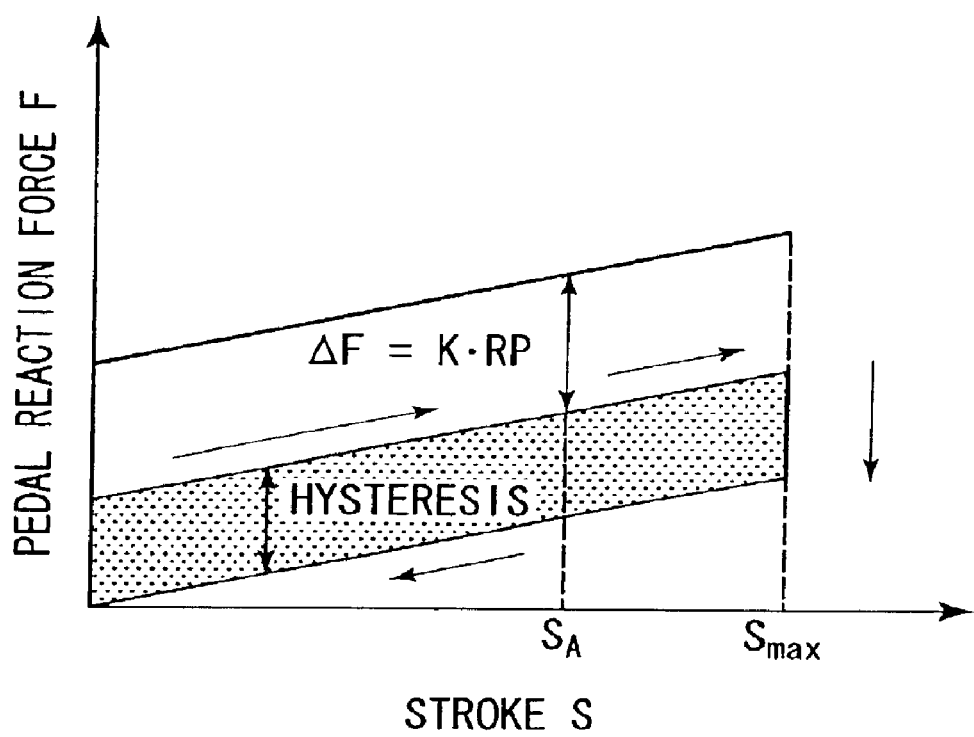
FIG. 11 is a figure showing the relationship between accelerator pedal stroke and pedal reaction force, with this preferred embodiment of the present invention.

For example, with the stroke S—pedal reaction force F characteristic as shown in FIG. 11, the reaction force characteristic in the normal state, in other words when the accelerator pedal reaction force control is not being performed by the reaction force control device 1 (i.e. when the system is not operating), is endowed with a hysteresis when the accelerator pedal 80 is stepped upon and is released, as shown by the dotted portion in the figure. Due to this, it is possible to keep the pedal stroke S constant even if the force by which the pedal is stepped upon varies by a certain amount, so that the maintainability of the pedal stroke S is enhanced.

Figure 12:
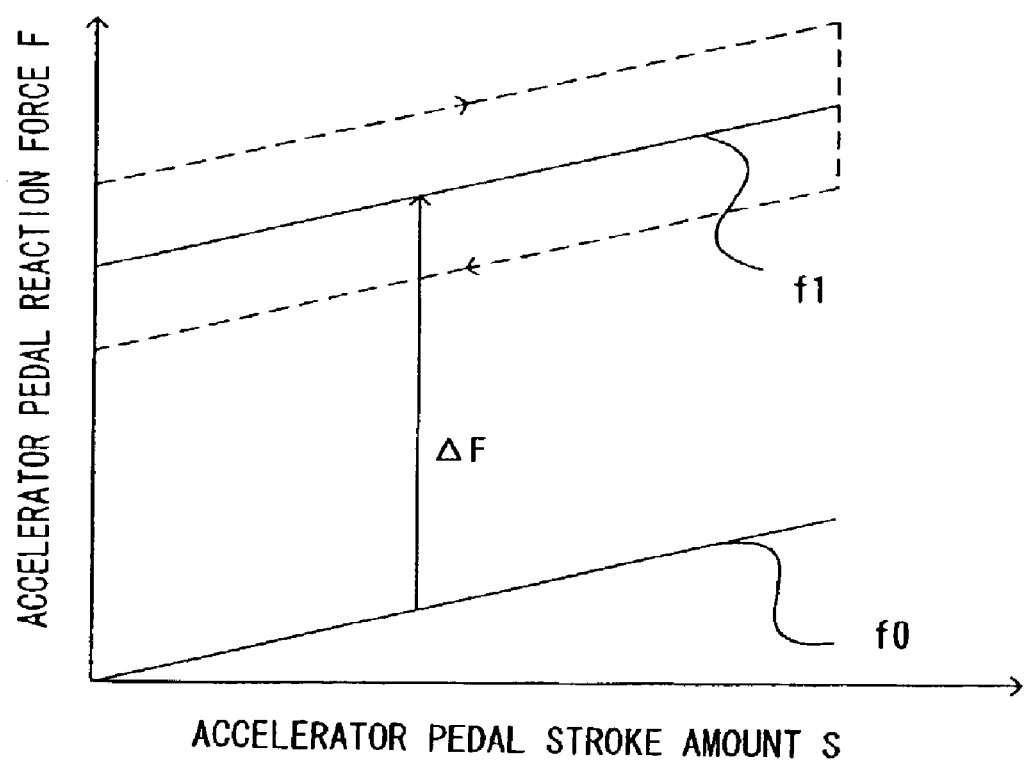
FIG. 12 is a figure showing an example of the accelerator pedal reaction force characteristic of the accelerator pedal device according to the preferred embodiment of the present invention when the system is operating.

On the other hand, during reaction force control (i.e. when the system is operating), an accelerator pedal reaction force F is generated which is increased over the reaction force characteristic during the normal state by just the accelerator pedal reaction force command value $\Delta F$. Due to this, the reaction force F of the accelerator pedal 80 comes to be determined according to the risk potential RP, and it is possible to cause the present and the future predicted running situation of the vehicle to be recognized by the driver of the vehicle via this accelerator pedal reaction force F. In this case, in order for the risk to be accurately sensed by the driver, it is desirable for the system to be endowed with a straight line characteristic with no hysteresis, as shown in FIG. 12.

Figure 7:
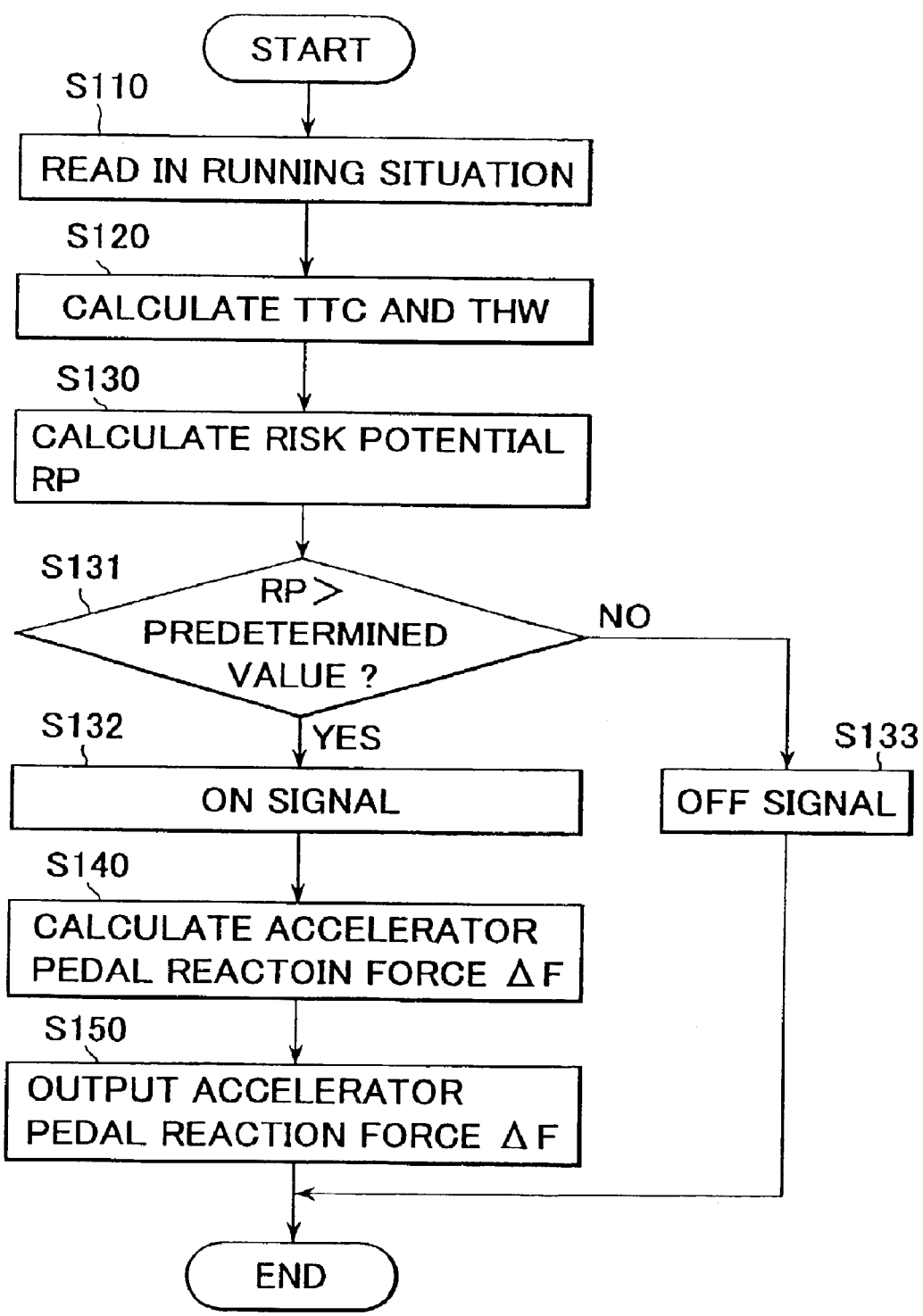
FIG. 7 is a flow chart showing the processing flow of an accelerator pedal reaction force control program according to the preferred embodiment of the present invention.
Figure 8:
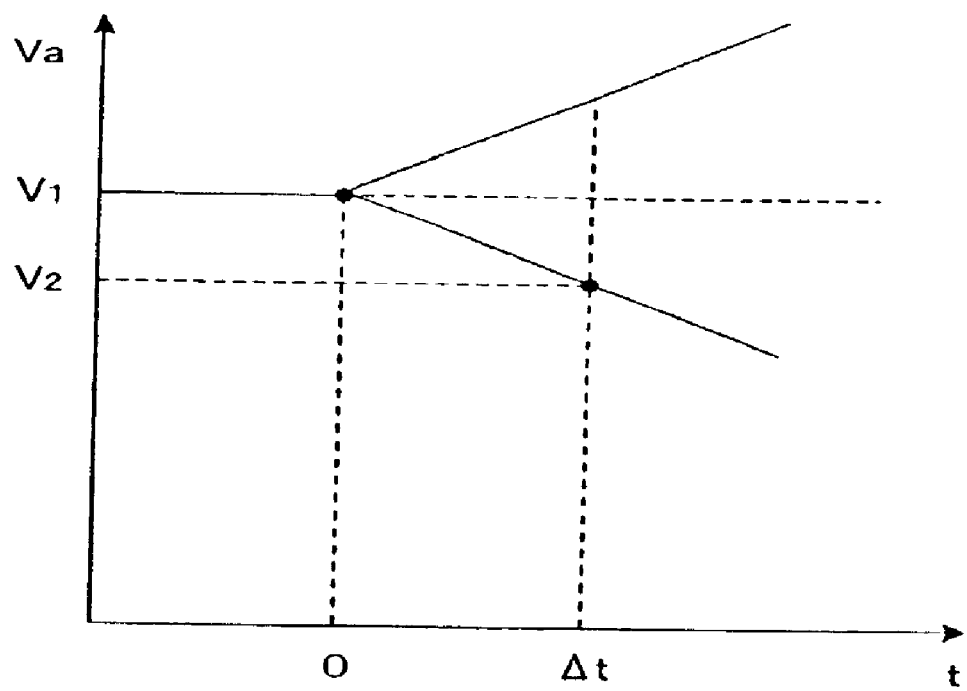
FIG. 8 is a figure showing variation of the future speed of the vehicle in front of the subject vehicle.

In the following, the manner in which the accelerator pedal reaction force command value is determined when the accelerator pedal reaction force control is being performed will be explained with reference to the flow chart shown in FIG. 7. It should be understood that FIG. 7 is a flow chart showing the processing flow of an accelerator pedal reaction force control program which is performed by the controller 50. The steps of this procedure are performed repeatedly in sequence at a fixed time interval (for example 50 msec).

The Processing Flow of the Controller 50 (FIG. 7)

First in the step S110 the vehicle running state, comprising the speed Vf of the subject vehicle, the distance D between vehicles to the vehicle in front, the relative speed Vr, and the speed of the vehicle in front Va, as detected by the laser radar 10 and the vehicle speed sensor 20, are read in.

In the next step S120, based upon this vehicle running state which has been read in, the present degree of proximity to the vehicle in front and the predicted degree of influence upon the subject vehicle due to change in the surrounding environment from now on are calculated. Here, a time to contact between vehicles TTC is calculated as the degree of proximity to the vehicle in front, while a time headway between vehicles THW is calculated as the predicted degree of influence. The time to contact between vehicles TTC may be referred to as a clearance time period between vehicles and the time headway between vehicles THW may be referred to as a time period between vehicles. In the following, this calculation of the time to contact between vehicles TTC and the time headway between vehicles THW will be explained.

The time to contact between vehicles TTC is a physical quantity that gives the current degree of proximity of the subject vehicle with respect to the vehicle in front. This time to contact between vehicles TTC is a value which gives whether or not, after a few seconds, if the present running situation is maintained, in other words if the subject vehicle speed Vf, the speed of the vehicle in front Va, and the relative vehicle speed Vr remain constant, the distance between vehicles D will become zero and the subject vehicle and the vehicle which is running in front of it will come into mutual contact; and it is obtained according to the following Equation (1):

$$\text{Time to contact between vehicles } TTC = D/Vr \qquad \text{(Equation 1)}$$

The smaller is the value of the time to contact between vehicles TTC, the more acute is the contact with the vehicle in front, and this means that the degree of proximity to the vehicle in front is great. For example, when the subject vehicle approaches towards the vehicle in front, it is known that almost every driver will have started to perform deceleration operation before the time to contact between vehicles TTC becomes less than 4 seconds. Although, in this manner, the time to contact between vehicles TTC is a quantity which exerts a great influence upon the driving performance of the driver, it is difficult to express the risk which the driver feels with respect to contact with the vehicle in front only by this time to contact between vehicles TTC.

For example, if the subject vehicle is running so as just to track after the vehicle in front without catching it up, then its relative vehicle speed Vr with respect to the vehicle in front is 0, and the time to contact between vehicles TTC is infinitely large. However in this case the risk which the driver feels is different if the distance between vehicles D is long or if it is short, and in fact the driver feels that the risk is the greater, the shorter is the distance between vehicles D. This is considered to be because the driver predicts the amount of influence upon the time to contact between vehicles TTC which will be caused by the variation in the future of the vehicle speed of the vehicle in front which he hypothesizes, and feels the risk to be the greater, if he recognizes that this influence is large.

Furthermore, with the time to contact between vehicles TTC which has been calculated according to Equation (1), it has been supposed that the relative speed Vr is constant, but actually there is a possibility that after Δt seconds the relative speed Vr will have changed. For example, it is not of course possible to predict the running speed Va of the subject vehicle accurately after Δt seconds, but it is possible to predict that it will be endowed with some deviation such as that shown in FIG. 8. Here, when the vehicle running speed V2 after Δt seconds has become slower than the current vehicle running speed V1, along with this the relative vehicle speed Vr changes, and the time to contact between vehicles TTC after Δt seconds has a smaller value as compared with what would be the case if the relative vehicle speed Vr remained constant, so that the risk as felt by the driver is higher. However, it is difficult to determine this from the time to contact between vehicles TTC which has been calculated based upon the current relative vehicle speed Vr. Thus, apart from the time to contact between vehicles TTC, if the subject vehicle is running so as just to track after the vehicle in front, the degree of influence upon the time to contact between vehicles TTC due to variation of the future vehicle speed of the vehicle in front which is hypothesized, in other words the degree of influence when it has been assumed that the relative vehicle speed Vr changes, is calculated. As the physical quantity which expresses the predicted degree of influence upon the time to contact between vehicles TTC, the time headway between vehicles THW which is given by one or the other of the following Equations (2) and (3) is used:

$$\text{Time headway between vehicles } THW = D/Va \qquad \text{(Equation 2)}$$

$$\text{Time headway between vehicles } THW = D/Vf \qquad \text{(Equation 3)}$$

This time headway between vehicles THW is the distance between vehicles D divided by the running speed of the vehicle in front Va or by the speed Vf of the subject vehicle Vf, and it represents the time period until the subject vehicle arrives at the current position of the vehicle in front. The greater is this time headway between vehicles THW, the smaller does the predicted degree of influence with respect to changes of the surrounding environment become. In other words, if the time headway between vehicles THW is great, even if in the future the vehicle speed of the vehicle in front changes, this will not exert a great influence upon the degree of proximity of the subject vehicle to the vehicle in front, so that the time to contact between vehicles TTC will not exhibit any very great change.

It should be understood that, since the time headway between vehicles THW is a value which expresses the degree of influence due to changes of the vehicle speed of the vehicle in front in the future, Equation (2) which uses the running speed Va of the vehicle in front is in better accordance with the risk which is experienced by the driver, than Equation (3) which uses the running speed of the subject vehicle Vf. However, since the running speed Va of the vehicle in front is calculated from the speed of the subject vehicle Vf and the relative vehicle speed Vr, accordingly it is possible to calculate the time headway between vehicles THW more accurately from Equation (2) which uses the subject vehicle speed Vf, which is detected with high accuracy by the vehicle speed sensor 20. It should be understood that, if the subject vehicle is running so as just to track after the vehicle in front, then Equation (2) is the same as Equation (3), since the subject vehicle speed Vf is equal to the running speed Va of the vehicle in front.

In the step S120 above, the time to contact between vehicles TTC and the time headway between vehicles THW are calculated. Next, in the step S130, the predicted future situation (the risk potential RP) is calculated based upon the time to contact between vehicles TTC and the time headway between vehicles THW which have thus been calculated in the step S120. This risk potential RP is given by the following Equation (4), and is a physical quantity which is given continuously as the sum of the degree of proximity to the vehicle in front (1/TTC) and the predicted degree of influence upon the future situation (1/THW), as adjusted by certain coefficients.

$$RP = a/THW + b/TTC \qquad \text{(Equation 4)}$$

It should be understood that a and b are respective parameters for appropriately weighting the degree of proximity and the predicted degree of influence, and they are suitably set, with a<b. It is desirable for the values of a and b to be estimated from statistics relating to the time headway between vehicles THW and the time to contact between vehicles TTC, and they may, for example, be set to values around a=1 and b=8.

It should be understood that, as will be understood from the above described Equations (1) through (3), the time to contact between vehicles TTC is the risk level regarding how many seconds the subject vehicle will take to come into contact with the vehicle in front, when it is assumed that the relative speed Vr between the vehicle in front and the subject vehicle is constant, while the time headway between vehicles THW is the risk level regarding how many seconds the subject vehicle will take to arrive at the current position where the vehicle in front is located, when it is assumed that the relative speed Vr between the vehicle in front and the subject vehicle will change in the future. This time to contact between vehicles TTC and time headway between vehicles THW are individually calculated from the present subject vehicle speed Vf, the speed Va of the vehicle in front, and the relative vehicle speed Vr, but it is possible to estimate the risk potential RP which is predicted for the future by adjusting these using Equation (4).

The risk potential RP is possible to correspond to the continuous change of the situation from tracking after the vehicle in front until approaching to the vehicle in front, and it is possible to express the degree of proximity in these circumstances. In other words, it is possible to determine that, the greater is the risk potential, the greater does the driver feel the risk of perhaps coming too close to the vehicle in front in the future to be.

Figure 9:
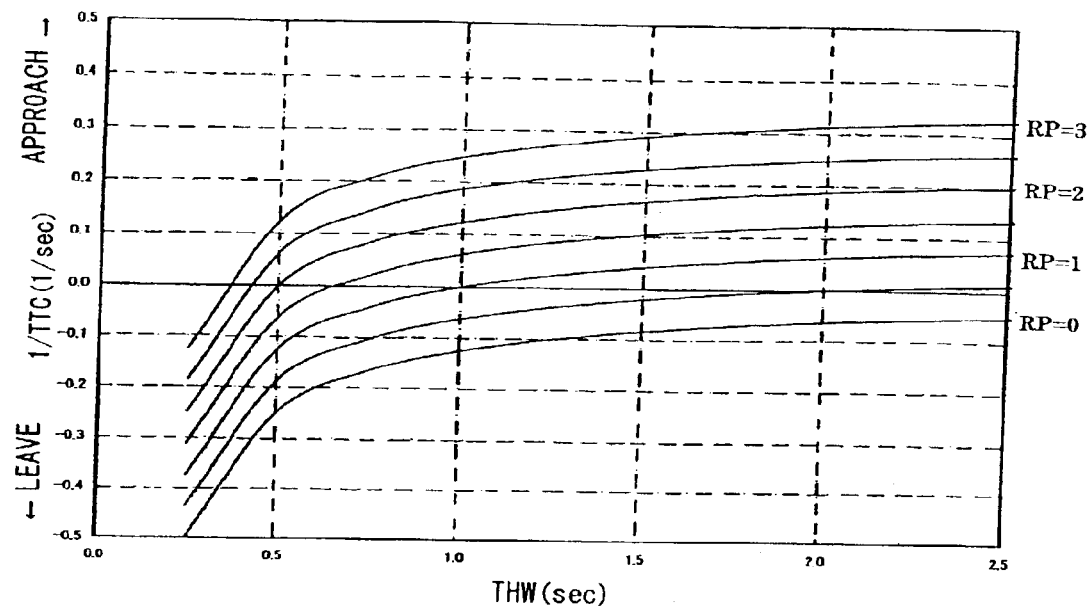
FIG. 9 is a figure showing the operation of the reaction force control device according to the preferred embodiment of the present invention.

In FIG. 9, the risk potential RP which is calculated from Equation (4) is shown, in a planar chart of the time headway between vehicles THW against the reciprocal of the time to contact between vehicles (1/TTC), as each line has each value of the risk potential RP. In FIG. 9, the time headway between vehicles THW is shown along the horizontal axis, and the reciprocal (1/TTC) of the time to contact between vehicles TTC is shown along the vertical axis; and, the more to the right along the horizontal axis, the farther is the subject vehicle running from the vehicle in front, while, the more upwards along the vertical axis, the closer is the subject vehicle to the vehicle in front, while the lower therealong, the farther is it removed from the vehicle in front. In FIG. 9, each line of equal risk potential RP is drawn as a smooth line from the upper right to the lower left, and the value of the risk potential RP changes continuously between these lines of equal risk potential. It should be understood that the smaller is the time headway between vehicles THW and the greater is the reciprocal 1/TTC of the clearance time period, i.e. the more to the upper left of FIG. 9, the greater is the value of the risk potential RP. In other words, the closer to the vehicle in front and the greater is the degree of proximity thereto, the higher does the value of the risk potential RP assume. Furthermore, even if the degree of proximity 1/TTC has the same value, the shorter is the time headway between vehicles THW, the greater does the value of the risk potential RP become.

In the step S131, a decision is made as to whether or not the risk potential RP which has been calculated in the step S130 is greater than a predetermined value. If it is decided that the risk potential RP is greater than the predetermined value, then the flow of control is transferred to the step S132. In the step 132, a signal to turn on the operation changeover relay 73 is output (the state of FIG. 6), and the flow of control is transferred to the step S140. In the step 131, if it is decided that the risk potential RP is not greater than the predetermined value, then the flow of control is transferred to the step S133. In the step 133, a signal to turn off the operation changeover relay 73 is output (the state of FIG. 5), and the control is terminated. In the step S131 through the step S133, it is decide or selected based upon the risk potential RP according to the running situation of the vehicle whether or not the control explained below to apply a reaction force corresponding to the reaction force command value ΔF is performed.

In the step S140, the accelerator pedal reaction force command value ΔF is calculated according to the following Equation (5), based upon the value of the risk potential RP which was calculated in the step S130:

$$\Delta F = K \cdot RP \quad \text{(Equation 5)}$$

Here, K is a constant value which should be set appropriately.

As shown in FIG. 9, the risk potential RP is given continuously for every running situation as defined by the time headway between vehicles THW and degree of proximity 1/TTC. By calculating the accelerator pedal reaction force command value ΔF using Equation (5), and by controlling the accelerator pedal reaction force according to the risk potential RP, it becomes possible to ensure that the degree of proximity to the vehicle in front is continuously recognized by the driver.

Next, in the step S150, the accelerator pedal reaction force command value ΔF which was calculated in the step S140 is outputted to the accelerator pedal reaction force control device 60, and then this episode of processing terminates.

In the step S130 described above, the value of the risk potential RP was calculated by weighting the present degree of proximity (1/TTC) and the predicted degree of influence (1/THW) individually and adding together with them using Equation (4). By doing this, it is possible to obtain the risk potential RP continuously even if the present degree of proximity or the predicted degree of influence change, and it is possible continuously to change the accelerator pedal reaction force which is set in correspondence to this risk potential RP. And it is possible for the driver accurately to recognize changes in the running situation of the vehicle from the accelerator pedal reaction force which changes smoothly and continuously.

It should be understood that the risk potential RP may also be calculated as shown in the following Equation (6):

$$RP = \max\{a/THW, b/TTC\} \quad \text{(Equation 6)}$$

In this case, as shown in Equation (6), the value of the maximum one among the degree of proximity (the reciprocal of TTC) to the vehicle in front and the predicted degree of influence (the reciprocal of THW) in the future state is selected as the value of the risk potential RP. It should be understood that a and b are parameters for weighting the degree of proximity and the predicted degree of influence respectively, and, for example, they may be appropriately set to around a=1 and b=8, with a<b. By doing this, it is possible to correspond to continuous change of the situation from tracking after the vehicle in front until approaching to the vehicle in front, and it is possible to express the degree of proximity in these circumstances.

Figure 10:
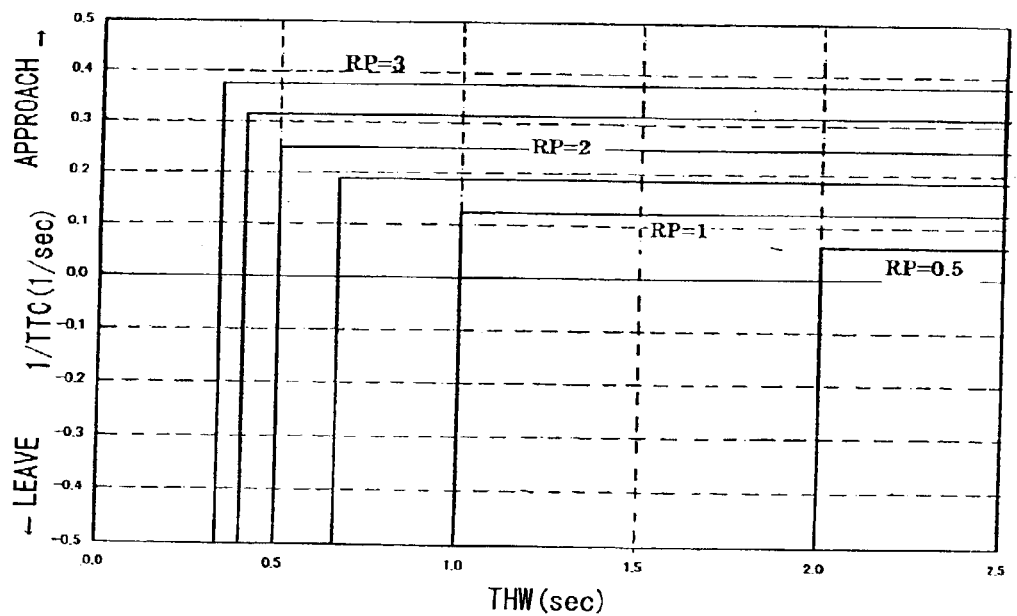
FIG. 10 is a figure showing the operation of a different reaction force control device according to the preferred embodiment of the present invention.

In FIG. 10, the risk potential RP which is calculated from Equation (6) is shown, in a planar chart of the time headway between vehicles THW against the reciprocal of the time to contact between vehicles (1/TTC), as each line has each value of the risk potential RP. In FIG. 10, just as in FIG. 9, the time headway between vehicles THW is shown along the horizontal axis, and the reciprocal (1/TTC) of the time to contact between vehicles TTC is shown along the vertical axis. As shown in FIG. 9, when calculating the risk potential RP using the above described Equation (4), at times such as when the relative speed Vr is negative so that the vehicle in front is moving faster than the subject vehicle and is getting farther away from it, even if the time headway between vehicles THW has the same value, the risk potential RP becomes extremely small. Along with this, the accelerator pedal reaction force command value ΔF also undesirably becomes extremely small.

On the other hand, in the value of the risk potential RP which has been calculated using Equation (6), the greater one of the present degree of proximity to the vehicle in front (1/TTC) and the predicted degree of influence (1/THW) in the future is selected. Due to this, even if the degree of proximity (1/TTC) is negative, in other words even if the relative vehicle speed is negative, the value of the risk potential RP does not drop below a predetermined value which is determined by the time headway between vehicles THW, as shown in FIG. 10. It should be understood that the time headway between vehicles THW is the time period for the subject vehicle to arrive at the current position of the vehicle in front, so that it can never have a negative value. Due to this, when the risk potential RP is calculated by using the above Equation (6), it is possible to prevent sudden change of the value of the risk potential RP, which would cause an undesirable sudden change of the accelerator pedal reaction force.

With this reaction force control device 1 according to this preferred embodiment of the present invention, the present degree of proximity to the vehicle in front (the time to contact between vehicles TTC) and the degree of influence due to change of the surrounding environment of the vehicle which is predicted for the future (the time headway between vehicles THW) are calculated, and these are added together with individual weightings in order to calculate the risk potential RP. And, by additionally applying a force which is proportional to this risk potential RP to the accelerator pedal reaction force, it becomes possible to control the reaction force of the accelerator pedal based upon a value which is close to the risk level which is actually felt by the driver of the vehicle. If the present degree of proximity to the vehicle in front is great (i.e. if the time to contact between vehicles TTC is small), or if the degree of influence for the future which is predicted is great (i.e. if the time headway between vehicles THW is small), then the risk potential RP becomes great, and a great accelerator pedal reaction force is generated in proportion to this relatively great risk potential RP. Due to this, when the degree of proximity to the vehicle in front is great so that the risk potential RP is great, the driver, who is stepping down upon the accelerator pedal 80, is induced towards releasing the accelerator pedal 80.

In concrete terms, by increasing the accelerator pedal reaction force, the driver is caused to recognize from this increased amount of reaction force the fact that the risk potential has increased, and by his own decision he is enabled to actuate (to release) the accelerator pedal to a satisfactory state. Furthermore, by increasing the accelerator pedal reaction force, the foot of the driver who is stepping down upon the accelerator pedal is naturally returned towards the release side, so that it is led towards a more satisfactory state, even though the driver does not particularly notice this fact. Yet further, since, by increasing the accelerator pedal reaction force, the necessary stepping upon force which is required when further stepping down upon the accelerator pedal from its current state of depression becomes greater, accordingly it is possible to restrain the driver from increasing the speed of the subject vehicle by further stepping down upon the accelerator pedal, so that it is possible to suppress further reduction of the distance between vehicles to the vehicle in front.

Moreover, if the accelerator pedal reaction force command value ΔF is determined based upon the risk potential RP which has been calculated using Equation (4), the risk potential RP changes continuously as shown in FIG. 9. Due to this, it is possible to cause the driver to recognize the vehicle running situation which corresponds to the degree of proximity 1/TTC to the vehicle in front and to the time headway between vehicles THW, via the accelerator pedal reaction force which is continuously transmitted to him. Furthermore, if the risk potential RP is calculated using Equation (6), the risk potential changes as shown in FIG. 10. Due to this, even if the vehicle in front accelerates away from the subject vehicle so that the degree of proximity 1/TTC becomes extremely small, it is still possible to perform accelerator pedal reaction force control in a stabilized manner, since the risk potential RP never changes abruptly.

Yet further, since the time to contact between vehicles TTC and the time headway between vehicles THW can be calculated using physical quantities which are each comparatively easy to calculate, such as the subject vehicle speed Vf, the speed of the vehicle in front Va, the distance between vehicles D, and the like, accordingly it is possible to suppress increase in the number of component parts which are required for the construction of this driving actuation assistance device for a vehicle. Moreover, when setting the parameters a and b for calculation of the risk potential RP, by setting the parameter b for the time to contact between vehicles TTC to be greater than the parameter a for the time headway between vehicles THW, it is possible to calculate the risk potential while giving greater weighting to the present degree of proximity to the vehicle in front than to the degree of influence due to change of the surrounding environment of the vehicle in the future.

Next, the details of the operation of the accelerator pedal device according to this preferred embodiment of the present invention will be explained.

(1) When the System is Operating

The laser radar 10 of the subject vehicle detects the vehicle in front, and the reaction force control system starts to operate when the risk potential exceeds a predetermined value. Due to the operation of this system, the coil of the operation changeover relay 73 is supplied with electrical current as shown in FIG. 6, and the contact points 73a of this relay 73 are closed, while its contact points 73b are opened. The controller 50 calculates the risk potential RP with respect to the vehicle in front as has been previously described, and the accelerator pedal reaction force control device 60 controls the output of the electric current control circuit 72 according to this calculated risk potential RP. Due to this, the torque of the servo motor 70 is controlled, and a motor torque reaction force ΔF which corresponds to the risk potential RP is additionally applied to the accelerator pedal 80 by being added to the reaction force which is produced by the tension spring 85.

An example of the reaction force F which is applied to the accelerator pedal 80 is shown by the characteristic f1 of FIG. 12. It should be understood that this characteristic f1 is a first characteristic, while the characteristic f0 in the figure is the reaction force characteristic of the tension spring 85 which serves as the base for this first characteristic f1. Since there is no sliding portion in the tension spring 85 such as is present in a torsion spring, the frictional force is smaller than if a torsion spring were to be employed. As a result, the generation of hysteresis is suppressed, and the spring reaction force which serves as a base changes in a linear manner, as shown by the characteristic f0.

Furthermore, since as described above the output shaft 70a of the servo motor 70 and the rotational shaft 82a of the accelerator pedal 80 are arranged via the planetary speed reduction mechanism 87 as being almost coaxial, therefore the mechanical loss is smaller as compared with the case of using a bevel gear or a worm gear or the like, so that the proportion of the torque which is transmitted is greater. As a result, it is possible to apply a reaction force ΔF to the accelerator pedal 80 which corresponds to the risk potential RP with good accuracy, and the generation of hysteresis is suppressed, so that the reaction force F which is applied to the accelerator pedal 80 changes in a linear manner as shown by the characteristic f1. It should be understood that it would also be possible to arrange the output shaft 70a of the servo motor 70 and the rotational shaft 82a of the accelerator pedal 80 almost coaxially without using the planetary speed reduction mechanism 87.

By providing a reaction force characteristic in this manner in which the frictional force of the spring and the mechanical loss of the gears is small so that there is no substantial hysteresis, the driver is enabled easily to sense the risk of approach to the vehicle in front. In other words, if the reaction force characteristic were to have hysteresis as shown by the dotted line in FIG. 12, even if a reaction force ΔF corresponding to the risk potential were to be applied to the accelerator pedal 80, it would be difficult for the driver accurately to apprehend the degree of risk, since there would be a danger that he might misunderstand the increase of the reaction force due to the influence of such hysteresis. By contrast to this, if the reaction force characteristic is linear, the driver can recognize the increase of reaction force as the increase of the risk directly, and he is able accurately to sense the risk of perhaps getting too close to the vehicle in front in the future.

(2) When the System is not Operating

When, for example, the laser radar 10 is not detecting any vehicle in front of the subject vehicle, the risk potential is below the predetermined value, and the reaction control system does not operate. When this system is not operating, as shown in FIG. 5, the supply of electric current to the coil of the operation changeover relay 73 is interrupted, and the contact points 73a of this relay 73 are opened, while its contact points 73b are closed. Due to this, both of the terminals of the servo motor 70 are grounded. In other words, both of the terminals are shorted. If at this time the accelerator pedal 80 is stepped down upon or is released, the output shaft 70a of the servo motor 70 is rotated according to this pedal actuation, and an induced electromotive force is generated in this servo motor 70.

Figure 13:
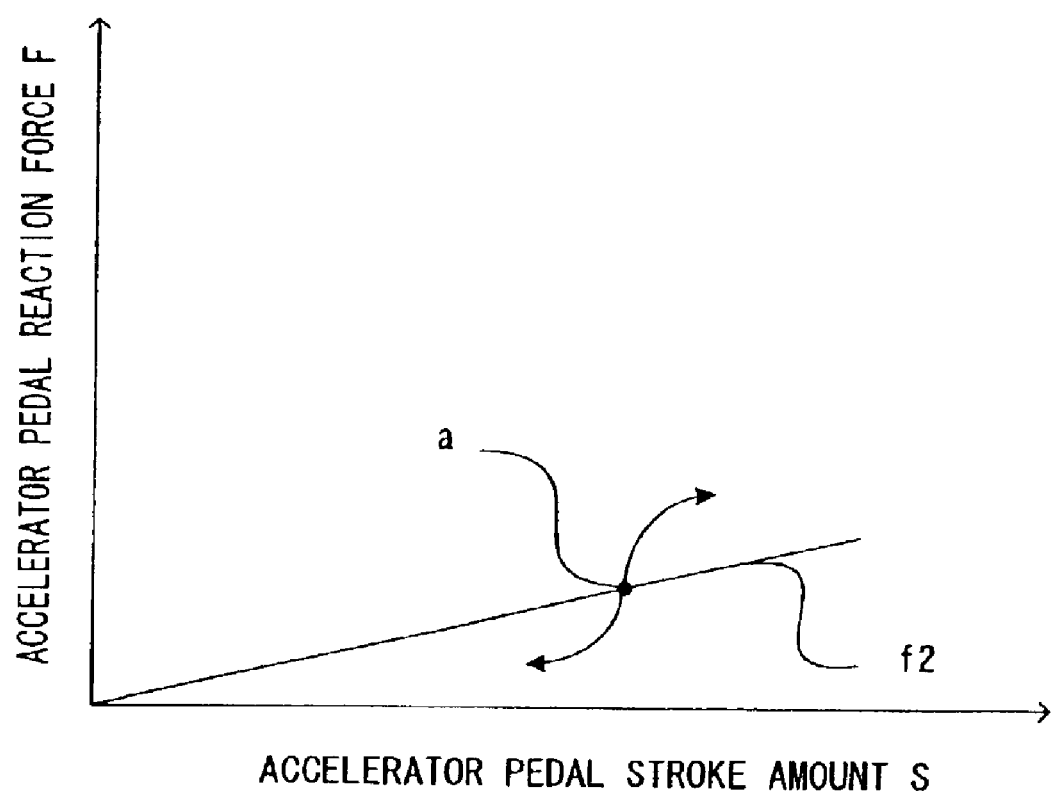
FIG. 13 is a figure showing an example of the accelerator pedal reaction force characteristic of the accelerator pedal device according to the preferred embodiment of the present invention when the system is not operating.

This induced electromotive force acts as a viscous force so as to impede the actuation of the accelerator pedal 80. As a result, if the accelerator pedal 80 is stepped down upon or is released, as shown in FIG. 13, the pedal reaction force F exhibits a second characteristic which is endowed with hysteresis. In other words, when at the time point a in FIG. 13 the accelerator pedal 80 is stepped down upon, the aforementioned viscous force is added to the spring reaction force (the characteristic f2), and the pedal reaction force F is increased as shown by the arrow sign. On the other hand, when at the time point a in FIG. 13 the accelerator pedal 80 is released, the return of the accelerator pedal 80 is checked by the viscous force, and the pedal reaction force F diminishes as shown by the arrow sign. By generating hysteresis in the pedal reaction force F in this manner, it is possible to maintain the pedal stroke amount S constant even if the force with which the accelerator pedal 80 is stepped upon varies a little, and the driver is able easily to perform adjustment of the speed of the vehicle.

If a breakdown has occurred in the reaction force control system (for example, if one of the signal lines has broken), the supply of operating electrical current to the coil of the operation changeover relay 73 is interrupted. Since due to this the reaction force characteristic becomes one which is endowed with hysteresis, it becomes easy for the driver to adjust the stroke of the accelerator pedal 80, so that the actuatability is good. It would also be possible, for example, for a signal to be inputted into the operation changeover relay 73 from a failure diagnose device not shown in the figure, and for this failure diagnose device to interrupt the supply of operating electrical current to the coil of the operation changeover relay 73 if it should detect a failure or a malfunction.

With the accelerator pedal device of the preferred embodiment of the present invention as described above, the following beneficial effects are obtained.

(1) The operation changeover relay 73 of the servo motor 70 is changed over according to whether the reaction force control system is operating or is not operating; and, when the system is operating (for example when a vehicle is present in front of the subject vehicle), the torque of the servo motor 70 is controlled, while, when the system is not operating (for example when no vehicle is present in front of the subject vehicle), no such torque control is performed, and the servo motor 70 is set so as to perform self-induction. By doing this, it is possible to apply reaction force to the accelerator pedal in two different patterns, and the management of these patterns is easy. In other words, it is possible to apply reaction force selectively either with a characteristic in which hysteresis is absent or is only present to a small degree, or with a characteristic which is endowed with substantial hysteresis, so that, by applying such reaction force properly according to circumstances, the convenience of use can be enhanced.

(2) Since the tension spring 85 and the servo motor 70 are linked to the accelerator pedal 80, and it is arranged to apply the spring reaction force and the motor torque reaction force to the accelerator pedal 80, thereby, along with it being possible to apply by such motor torque control a pedal reaction force ΔF which corresponds to the risk potential, it is also possible to apply a pedal reaction force so as to generate hysteresis by taking the spring reaction force as a reference.

(3) Since the reaction force is applied to the accelerator pedal 80 using the servo motor 70, it is possible to perform the reaction force control accurately.

(4) Since the output shaft 70a of the servo motor 70 and the rotational shaft 82a of the accelerator pedal 80 are arranged almost coaxially via the planetary speed reduction mechanism 87, it is possible to reduce the mechanical loss in the gears, and it is possible to suppress the generation of hysteresis during reaction force control.

(5) Since it is arranged to perform electrical current control of the servo motor 70 during operation of the system, while when the system is not operating both the terminals of the servo motor 70 are short circuited together, accordingly, although electrical current control of the servo motor 70 is not performed when the system is not operating, it is possible easily to provide a hysteresis characteristic.

(6) Since the tension spring 85 is used as a return spring for the accelerator pedal 80, the frictional force is reduced as compared with the case of use of a torsion spring, so that it is possible to suppress the generation of hysteresis by the return spring itself during reaction force control.

The accelerator pedal device according to the present invention is not to be considered as being limited to the above described preferred embodiment; various modifications are possible. For example, although in the above description a reaction force characteristic having hysteresis when the system was not operating was provided by self-induction of the servo motor 70, it would also be possible to provide such a hysteresis characteristic by a signal from the electrical current control circuit 72. In such a case, it is desirable to calculate the speed of the actuation of the accelerator pedal 80 by time differentiation of its actuation as detected by the stroke sensor 71, and to control the torque of the servo motor 70 so as to apply a reaction force which is proportional to this calculated actuation speed.

Moreover, although in the shown preferred embodiment of the present invention the reaction force was applied to the accelerator pedal 80 by the use of the servo motor 70, it would also be possible to apply such a reaction force by the use of some other type of actuator, provided that it was one which could adjust the applied reaction force as desired. Furthermore, although in the shown preferred embodiment it was arranged during system operation to perform reaction force control according to the risk potential, it would also be possible to apply some type of control other than one according to the risk potential to the accelerator pedal device of the present invention to some other type of control, provided that it was one in which reaction force control was to be performed according to the vehicle operational state or the running environment in the surroundings of the vehicle. Yet further, although during reaction force control it is desirable to apply reaction force in a no hysteresis state, it is not absolutely necessary for no hysteresis at all to be applied during such reaction force control. Finally, rather than the tension spring 85, it would also be possible to employ a spring member which had some other structure.

In the above described embodiment, it is selected by executing the step S131 through the step S133 in FIG. 7 whether or not the reaction force corresponding to the reaction force command value ΔF is applied. However, the step S131 through the step S133 may be deleted. In this case, the electric current control circuit 72 is always connected to the servo motor 70. And when the substantial zero value of the reaction force command value ΔF is calculated, the characteristic in which the reaction force corresponding to the reaction force command value ΔF is not applied is substantially selected.

The above described embodiments are examples, and various modifications can be made without departing from the spirit and scope of the invention.

The disclosure of the following priority application is herein incorporated by reference:

Japanese Patent Application No. 2002-180005 filed Jun. 20, 2002.

What is claimed is:

1. An accelerator pedal device for a vehicle, comprising:
   an accelerator pedal;
   an accelerator pedal reaction force control device for controlling reaction force to be applied to the accelerator pedal;
   a selection device for selecting a first characteristic or a second characteristic of reaction force to be applied to the accelerator pedal; and
   a reaction force application device, responsive to the selection device, for applying reaction force to the accelerator pedal according to the first characteristic while the accelerator pedal reaction force control device is activated and applying reaction force to the accelerator pedal according to the second characteristic while the accelerator pedal reaction force control device is inactive;
   wherein at least said first characteristic is determined by the accelerator pedal reaction force control device as a function of a running situation of the vehicle and the operating condition of the vehicle; and
   wherein one of said first characteristic and said second characteristic has substantially less hysteresis than the other of said first characteristic and said second characteristic.

2. An accelerator pedal device according to claim 1, wherein:
   the selection device selects a characteristic between the first characteristic and the second characteristic based upon the running situation of the subject vehicle.

3. An accelerator pedal device according to claim 1, wherein:
   the first characteristic is a characteristic to apply the reaction force with substantially no hysteresis corresponding to the amount of stepping upon of the accelerator pedal; and
   the second characteristic is a characteristic to apply the reaction force with hysteresis corresponding to the amount of stepping upon of the accelerator pedal.

4. An accelerator pedal device according to claim 3, wherein:
   the second characteristic is specified so that a reaction force to be applied when the amount of stepping upon of the accelerator pedal start to become greater at a predetermined amount of stepping upon of the accelerator pedal is greater than reaction force to be applied when the amount of stepping upon of the accelerator pedal become smaller at the predetermined amount of stepping upon of the accelerator pedal.

5. An accelerator pedal device according to claim 1, wherein:
   the first characteristic is a characteristic in which a reaction force specified according to the running situation of the subject vehicle is added to a reaction force according to the second characteristic.

6. An accelerator pedal device according to claim 5, wherein:
   the reaction force application device calculates, based upon the running situation of the subject vehicle, a degree of proximity to a vehicle in front at the present time and a degree of influence upon the subject vehicle due to a trend of movement of the vehicle in front predicted in the future, and calculates the reaction force to be added to the reaction force according to the second characteristic based upon the calculated degree of proximity and the degree of influence.

7. An accelerator pedal device according to claim 1, wherein the reaction force application device comprises:
   a spring member that applies a first reaction force corresponding to the amount of stepping upon the accelerator pedal; and
   an actuator that applies a second reaction force additionally to the first reaction force by the spring member according to the running situation of the subject vehicle when the first characteristic is selected, and applies a third reaction force in a hysteresis manner additionally to the first reaction force by the spring member when the second characteristic is selected.

8. An accelerator pedal device according to claim 7, wherein:
the accelerator pedal is rotatable around a rotational shaft; and
the actuator is a servo motor that applies a torque reaction force to the rotational shaft of the accelerator pedal.

9. An accelerator pedal device according to claim 8, wherein:
an output shaft of the servo motor and the rotational shaft of the accelerator pedal are arranged via a gear mechanism, as being substantially coaxial.

10. An accelerator pedal device according to claim 8, wherein:
the selection device outputs a control electrical current to the servo motor according to the running situation of the subject vehicle when the first characteristic is selected, and substantially shorts both terminals of the servo motor when the second characteristic is selected.

11. An accelerator pedal device according to claim 7, wherein:
the spring member is a tension spring whose one end is linked to the accelerator pedal, while its other end is linked to a body of the vehicle.

12. A vehicle, comprising:
an accelerator pedal;
an accelerator pedal reaction force control device for controlling reaction force to be applied to the accelerator pedal;
a selection device for selecting a first characteristic or a second characteristic of reaction force to be applied to the accelerator pedal; and
a reaction force application device, responsive to the selection device, for applying reaction force to the accelerator pedal according to the first characteristic while the accelerator pedal reaction force control device is activated and applying reaction force to the accelerator pedal according to the second characteristic while the accelerator pedal reaction force control device is inactive;
wherein at least said first characteristic is determined by the accelerator pedal reaction force control device as a function of a running situation of the vehicle and the operating condition of the vehicle; and
wherein one of said first characteristic and said second characteristic has substantially less hysteresis than the other of said first characteristic and said second characteristic.

13. A method for controlling reaction force to be applied to an accelerator pedal by an accelerator pedal reaction force control device, comprising the steps:
selecting a first characteristic or a second characteristic of reaction force to be applied to the accelerator pedal;
applying reaction force to the accelerator pedal according to the first characteristic while the accelerator pedal reaction force control device is activated;
applying reaction force to the accelerator pedal according to the second characteristic while the accelerator pedal reaction force control device is inactive; and
determining at least the fist characteristic as a function of a running situation of the vehicle and the operating condition of the vehicle;
wherein one of said first characteristic and said second characteristic has substantially less hysteresis than the other of said first characteristic and said second characteristic.

* * * * *